United States Patent [19]

Ishinaga et al.

[11] Patent Number: 5,001,920
[45] Date of Patent: Mar. 26, 1991

[54] METHOD AND APPARATUS FOR MANUFACTURING A CONSTANT VELOCITY JOINT AND THE LIKE

[75] Inventors: Nobuyuki Ishinaga; Kiyoshi Sugimoto, both of Sagamihara; Takashi Nakano, Kanagawa, all of Japan

[73] Assignee: Aida Engineering, Ltd., Kanagawa, Japan

[21] Appl. No.: 242,319

[22] Filed: Sep. 9, 1988

[51] Int. Cl.$^5$ .............................................. B21J 13/02
[52] U.S. Cl. ...................................... 72/345; 72/353.4
[58] Field of Search ................. 72/345, 353, 354, 355, 72/358

[56] References Cited

U.S. PATENT DOCUMENTS 4,610,155  9/1986  Langford et al. ..................... 72/353

FOREIGN PATENT DOCUMENTS 0153810   9/1985  European Pat. Off. .
52-24978  2/1977  Japan .
181737   11/1982  Japan .
30545    2/1985  Japan ..................................... 72/354
WO87/01061 2/1987  PCT Int'l Appl. .

Primary Examiner—Lowell A. Larson
Attorney, Agent, or Firm—Spencer & Frank

[57] ABSTRACT

A method and apparatus for manufacturing a product such as a constant velocity joint having a recess whose opening has a lesser diameter than its interior, by ironing a workpiece supplied to working parts of punches which workpiece is pre-formed into a hollow structure whose opening has an excess of metal required to be ironed. A group of punches are mounted in a loop around a punch guide for relative axial movement. The group of punches includes a set of first punches and a set of second punches, disposed alternately. Each punch has a working part at an upper end thereof and the working parts are closely assembled in a closed loop at the time of the forming process. Each punch is formed with a groove in a side which is slidable along the punch guide. The grooves in the first punches are different in length from those in the second punches. After the workpiece is supplied to the working parts of the punches and ironed to narrow the diameter of the opening relative to the interior of the recess, the punches are moved upwardly relative to the punch guide to narrow firstly the outer diameter of the working parts of the set of first punches and secondly the outer diameter of the working parts of the set of second punches and pull up the formed workpiece from the punches.

11 Claims, 7 Drawing Sheets

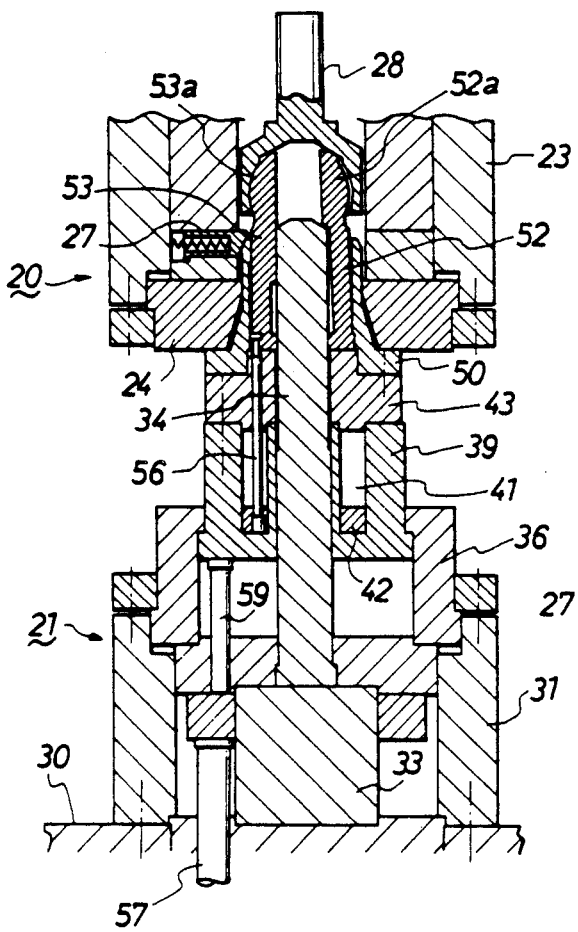
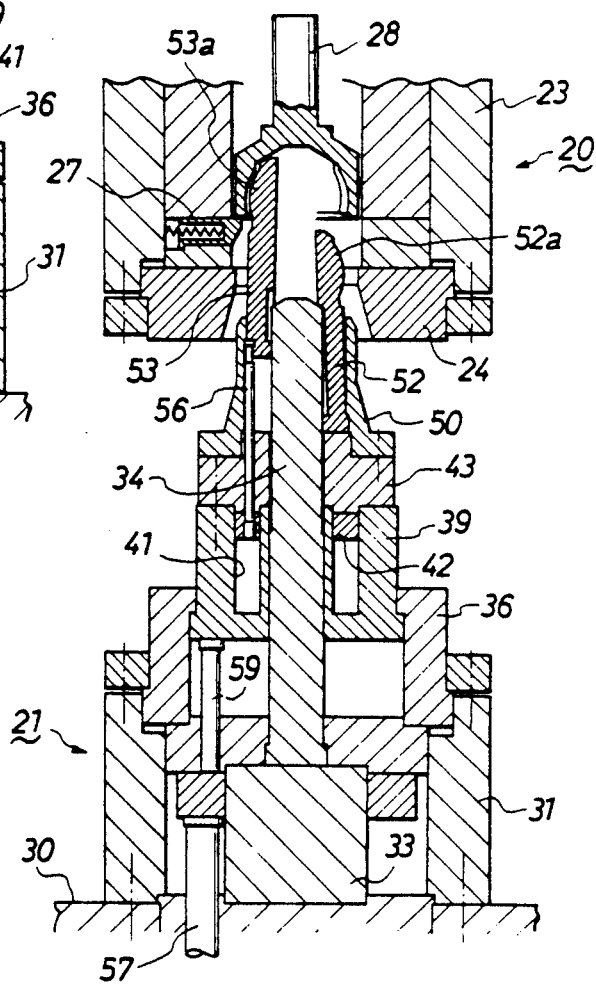

METHOD AND APPARATUS FOR MANUFACTURING A CONSTANT VELOCITY JOINT AND THE LIKE

BACKGROUND OF THE INVENTION

The present invention relates to a method and an apparatus for manufacturing a constant velocity joint and more particularly an outer race thereof.

The constant velocity joint to be manufactured by the present invention is a joint for use in a front wheel drive vehicle, and it is a joint which transmits rotation from a drive axle to a driven one at the same speed so as to cause no advance or delay therebetween in the rotational angle. A typical constant velocity joint is illustrated in FIGS. 12A and 12B. In these drawings, an outer race 1 of the constant velocity joint has a recess 2 for housing balls, cages, etc. The recess 2 is ironed so that the opening 2a has a smaller diameter than does the interior, that is, the interior surface of the race 1 defining the recess 2 curves into the recess in radially outward directions. The inner wall of the recess 2 is formed with six ball-retaining grooves 3, and adjacent thereto, six cage-retaining portions 4.

Attempts have been made to manufacture outer races by cold forging, which is good in stock utilization and effective in saving resources. In cold forging, half-finished parts whose recesses are not yet ironed are supplied to dies and go through the forging process to become final products.

A forging method and apparatus for manufacturing constant velocity joints are known. FIGS. 13A and 13B show a prior art die while FIG. 14 shows a workpiece supplied to a working part of a punch. The prior art die comprises a group of groove-cutting punches 10 of the same number with recesses or ball-retaining grooves in the outer race, the punches 10 being disposed around a punch guide 11, as shown in FIG. 14, and portions adjacent to the ball-retaining grooves serve to retain cages.

The working part in the end of the punch 10 is mounted movable on a pivot 12. Numerals 13, 14 and 15 respectively indicate an ironing die, an ironed workpiece, and a spring for pivotally moving the punch 10.

A group of spaced apart punches 10 are disposed around the punch guide 11, and each punch has a working part at its upper end in FIGS. 13A and 13B, for cutting the ball-retaining groove. The workpiece 14, which is preformed as a hollow structure, comes into contact with the working parts of the punches set by the punch guide 11 and is then ironed with the use of the die 13 so as to narrow the outside diameter. After completing the ironing process, the punches 10 are moved relative to the punch guide 11 to pivot working parts inward, whereupon the group of punches is pulled out of the ironed workpiece 14.

The prior art, in which the removal of the punches from the ironed workpiece is done after pivoting the working parts of the punches inward, necessitates providing spaces between respective punches set in place by the punch guide. Therefore, the ironed workpiece was formed with excess metal raised portions at such positions corresponding to the spaces. After ironing, these raised portions which correspond to the cage-retaining portions were required to be mechanically shaved off for finishing. Thus, the prior art method was inefficient in requiring an additional manufacturing step and material waste.

Further, the prior art method has the added disadvantageous of causing malfunctions of the machine in that, for example, the aforementioned raised portions can prevent the punches from being drawn radially inward for removal.

These disadvantages are caused by the requirement of providing spaces between the punches when they are set by the punch guide, but the provision of such spaces has been considered to be essential in order to draw the punches radially inward after the formed process.

A proposed improved method has been made in order to eliminate the latter mechanical process subsequent to the forming process. As shown in FIG. 15, a workpiece 16 was preformed with escape grooves 16c at positions corresponding to cage-retaining portions 16b adjacent to ball-retaining grooves 16a. An ironing process was performed with the escape grooves being respectively located at the spaces between the punches, so as to prevent the portions of the workpiece in the spaces between the punches from rising above the cage-retaining surfaces and to confine such rise to within the escape grooves. This method was proposed to reduce the number of processes of manufacture by eliminating the mechanical finishing process.

When performing the above proposed method, however, it has been difficult to fix the width, length and depth of the escape groove to its dimensions so as to serve to eliminate the mechanical process subsequent to the forming process, because a change in quantity of the raised portion is caused by a very small change in the volume of the workpiece. If the product may be left with groove traces where the escape grooves had been performed, then it may be grooved to the extent that will avoid the raised portions. But if the existence of such groove traces is unacceptable, it is still necessary to mechanically shave off the traces in the cage-retaining portions after the forming process. Considering that this method may still be disadvantageous in terms of the number of processes required and stock utilization, this method does not in fact provide an improvement over the prior art.

SUMMARY OF THE INVENTION

An object of the present invention is to solve the above problems of the prior art and to provide a method and an apparatus which enable a formed product such as a constant velocity joint of the above-described type, to be obtained with no raised portions, with use of a group of closely assembled punches, thereby making a full use of the resources-saving effect which is characteristic of cold forging, and simplifying the processes by minimizing the mechanical process subsequent to the forming process.

Another object of the invention is to provide a method and an apparatus which enable manufacture of such a formed product having a high inner circumferential accuracy using a group of closely assembled punches, by preventing the punches from slipping out of the set positions.

According to the invention, there are provided a method and an apparatus in which a plurality of punches are disposed around a punch guide and slidable therealong, with working parts of the punches being closely assembled so as to constitute a group of punches shaped to have a desired recess configuration, to which working parts a workpiece preformed with a recess is supplied to be ironed so that the opening of the recess has a smaller diameter than the maximum diameter within the recess. Then, the group of punches accompanied with the ironed workpiece are moved relative to the punch guide, and thereafter the working parts are tilted toward the axis of the punch guide half of the group of punches at a time, thereby reducing the outer diameter of the group of punches and permitting removal of the ironed workpiece from the group of punches, half of the punches being removed after being axially spaced from the other previously removed half.

The group of punches according to the invention includes first and second sets of punches, each punch of the first set (first punches) having a radially parallel or tapering configuration where it is in contact with an adjacent ones of the second set of punches (second punches), the first and second punches being disposed alternately in a closed loop and mounted for alternate relative movement, whereby the ironing process can be performed with the punches in a closely assembled condition, and after the process the first punches can be drawn radially inwardly independently of the second punches and then, after axially spacing the first punches from the second punches, the second punches can be drawn radially inward.

As mentioned above, according to the invention, the punches constituting the group are closely assembled so that the inside of the formed product will have no such raised portions as seen in the prior art, and consequently no mechanical process to eliminate such raised portions will be necessary after the forming process.

Further, the invention improves stock utilization by eliminating the need to shave off the raised portions after forming.

Further, because of the difference in timing to reduce the outer diameters of the first and second sets of punches constituting the group, the group of circularly arranged punches is reduced in outer diameter half by half in order to take out the formed workpiece from the group of punches. Therefore, a product ironed to have an opening narrower than the interior such as a constant velocity joint can be manufactured in one forging process.

Still further, according to the invention, the working parts of the punches are drawn inward and removed from the product in two stages so that the formed product can be processed to have a recess opening with a much smaller diameter than the maximum diameter of interior of the recess. As a result, it is possible to deepen grooves in which the balls are housed, and if the formed product is a constant velocity joint, to improve the performance of the joint.

In addition, the forming process is done with the punch working parts being closely assembled, and the punches will not slip out of the positions at the time of forming. Therefore, it is possible to manufacture the product with a high accuracy in its recess.

BRIEF DESCRIPTION OF THE DRAWINGS

These and other features and advantages of the invention will be readily apparent from the following detailed description of the preferred embodiments with reference to the accompanying drawings of which:

FIGS. 1 to 4 show a first embodiment of the invention, wherein

FIG. 1 is a sectional view of a die apparatus in a position of completing a work, FIG. 3 is a sectional view of the apparatus showing a condition wherein first punches are moved radially inward after completing the work, and FIG. 4 is a sectional view showing a condition wherein the set of second punches is reduced in diameter after the set of first punches is reduced in diameter;

FIGS. 5 to 7 show a second embodiment of the invention, wherein

FIG. 5 is a sectional view of a die apparatus in a position of completing a work, FIG. 6 is a sectional view showing a condition of the apparatus first and second punches are moved radially inward after the work is completed, and FIG. 7 is a sectional view of a support ring;

FIGS. 8 and 9 show a third embodiment of the invention, wherein

FIG. 8 is a sectional view of a die apparatus in a position of completing a work, and FIG. 9 is a sectional view of a condition of the apparatus wherein punches are moved radially inward after the work is completed;

In FIGS. 4, 6 and 9 for clarity illustration of all but one each of the first and second punches is omitted.

DESCRIPTION OF THE PREFERRED EMBODIMENTS

Figure 1:
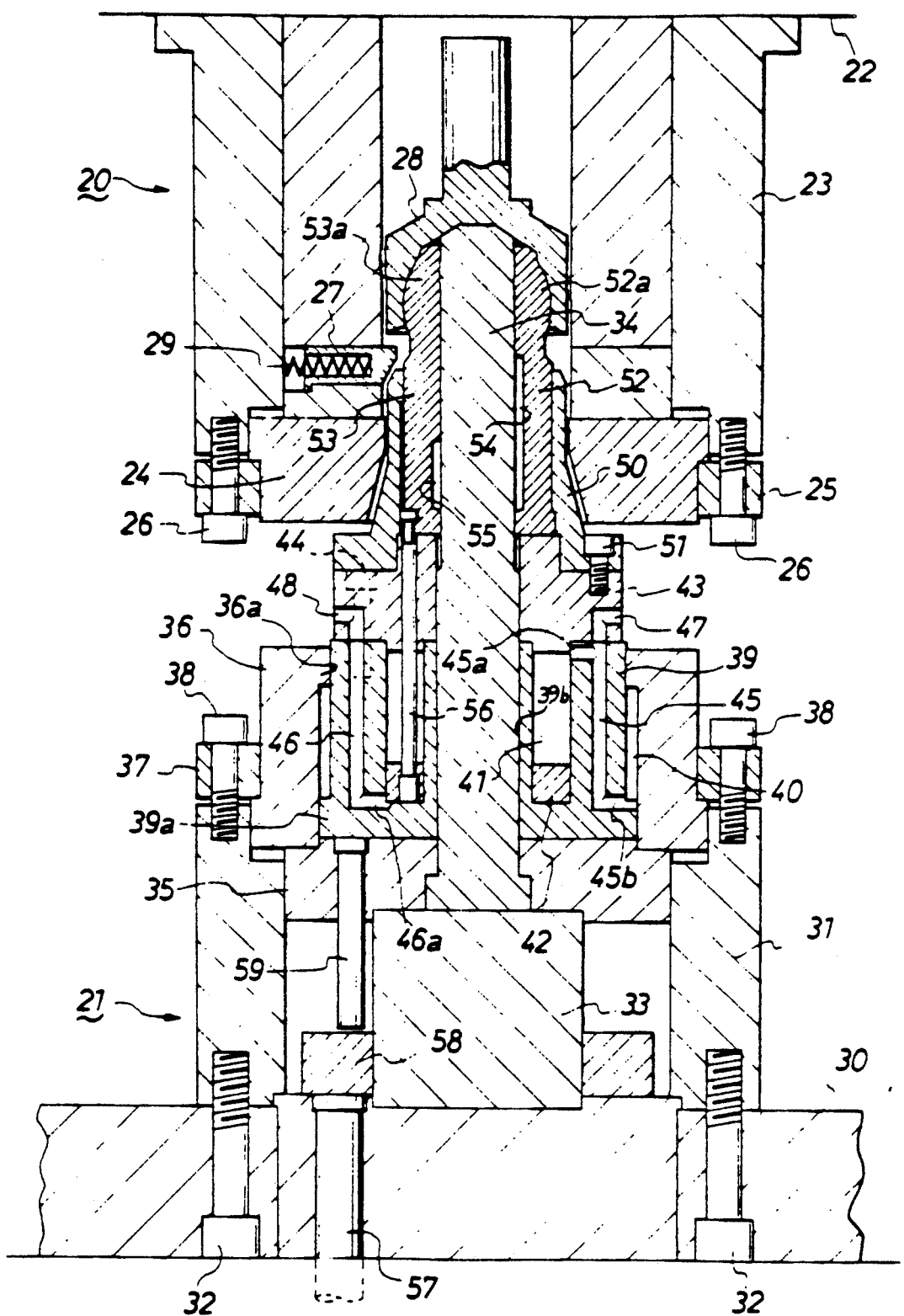

FIGS. 1 to 4 show a first embodiment of the apparatus of the invention, FIG. 1 being a sectional view of a forming die apparatus. Reference numerals 20 and 21 respectively designate an upper die assembly set on a press slide and a lower die assembly on a press bolster, the press slide and press bolster being omitted in the figure for clarity of illustration of the die assemblies.

The upper die assembly 20 includes an upper die set plate 22, a cylindrical upper die holder 23 fixed to the lower surface of the die set plate 22, and an ironing die 24 fixed to the lower end of the holder 23. The ironing die 24 has its outer circumference fixed via a pressure ring 25 by bolts 26. Reference numeral 27 designates a stopper for supporting a formed part 28 set in the central opening of the holder 23, which stopper is biased by a spring 29 into the opening.

The lower die assembly 21 has a lower die set plate 30, on which a cylindrical lower die holder 31 is fixed by bolts 32. An anvil 33 is provided on the lower die set plate 30 within the lower die holder 31, and a rod-like punch guide 34 is in contact with the center of the anvil 33 and kept vertical by a pressure plate 35 which also serves to fix the anvil 33.

A lower die cylinder 36 is provided inside the upper part of the lower die holder 31, with its lower outer circumference being retained by a pressure ring 37 and, with this ring, fixed to the lower die holder 31 by bolts 38. The lower end of the cylinder 36 supports the pressure plate 35. Housed within the cylinder 36 is a cylindrical slider 39 having an inner surface 39b in contact with the punch guide 34.

The cylindrical slider 39 has its lower end formed as a piston 39a which is in contact with the inner wall of the cylinder 36, while a small inner diameter portion 36a formed in the upper end of the cylinder 36 is in contact with the out wall of the cylindrical slider 39. Any of these members are slidable with respect to one another, and this arrangement allows an air chamber 40 to be formed between the cylinder 36 and the cylindrical slider 39. Further, the cylindrical slider 39 has a cylindrical recess 41 surrounding the inner surface 39b, and a slidable ring piston 42 is housed within the recess 41. Recess 41 opens into the top of the slider 39. The upper part of the cylindrical slider 39 protrudes from the opening of the cylinder 36, and a punch support body 43 for closing the recess 41 is fixed by bolts 44 to the top of the cylindrical slider 39.

Further, the cylindrical slider 39 has passages 45 and 46 for fluid pressure which are respectively communicating with inlet/outlet passages 47 and 48 formed in the side of the punch support body 43. The passage 45 has supply passages 45a and 45b, the former passage communicating with an upper chamber of recess 41 defined above the ring piston 42 and the latter communicating with the air chamber 40 disposed between the cylinder 36 and the cylindrical slider 39. On the other hand, the passage 46 has a supply passage 46a communicating with a lower chamber of recess 41 defined below the ring piston 42 (see FIG. 4).

A punch holding tube 50 is fixed by bolts 51 onto the punch support body 43, and within the punch holding tube 50, a group of six rod-like punches 52 and 53 ar disposed along and around the punch guide 34, including three first punches 52 and three second punches 53, punches 52 and 53 being alternately arranged. The cylindrical slider 39, the punch support body 43 and the punch holding tube 50 are formed as an integral structure, and since the punches 52 and 53 are superposed on the punch support body 43, the punches move up and down slidably along the punch guide 34 as the cylindrical slider 39 goes up and down. When the cylindrical slider 39 is at its lower limit as shown in FIG. 1, the upper ends of the punches 52 and 53 are approximately at the same elevation with the top of the punch guide 34. When the punches 52 and 53 are at the lower limit as illustrated in FIG. 1, working parts 52a and 53a formed in the upper ends of the punches 52 and 53 are closely assembled, that is, their adjacent side surfaces are flush with each other. The shape formed by the closely assembled working parts 52a and 53a and the top of the punch guide 34 define the shape of the recesses to be made in the outer race.

Figure 2A:
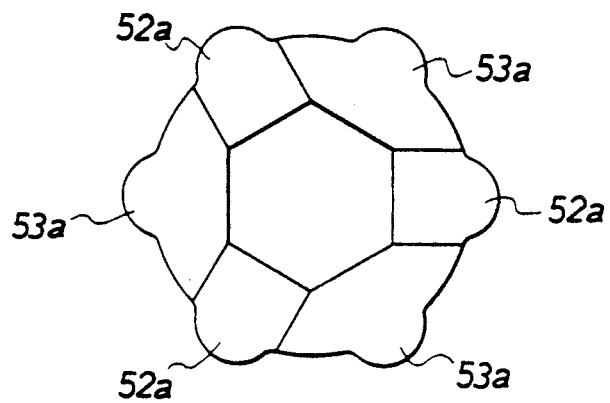
FIGS. 2A, 2B and 2C are plan views of working parts of punches at successive positions thereof during use.
Figure 2B:
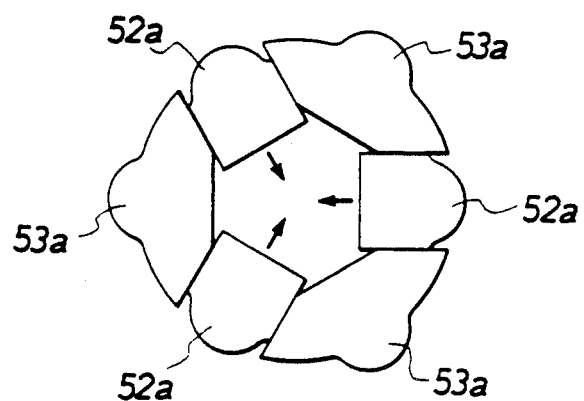
Figure 2C:
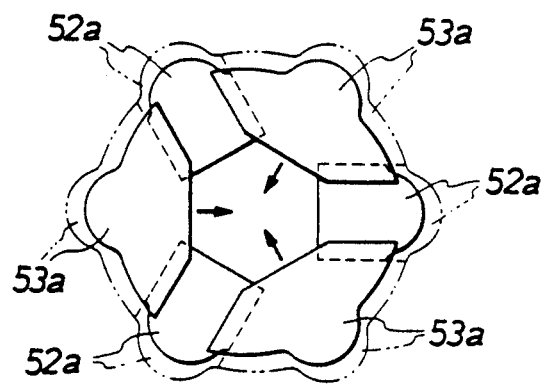

As shown in FIG. 2A, the first and second punches 52 and 53 are disposed alternately. The working parts 52a of the first punches 52 are each formed with generally radially extending side surfaces which are parallel or taper away from each other in a direction away from the center of the group of punches so that they can be individually moved radially inward while all of the working parts 52a and 53a are in a closely assembled condition.

Again with reference to FIG. 1, the first punches 52 have respective axial grooves 54 and the second punches 53 have respective axial grooves 55, each groove being formed in the punch on its side which is slidable with the punch guide 34. The grooves 54 in the first punches are longer while the grooves 55 in the second punches are shorter. These grooves 54 and 55 help the working parts to be drawn radially inward. When the punches 52 and 53 move up, the longer grooves 54 reach above the top of the punch guide 54, permitting only the first punches 52 to tilt inward (see FIG. 3) so as to move the working parts 52a radially inwardly. Further, when the second punches 53 move further up and the shorter grooves 55 reach above the top of the punch guide 34 (see FIG. 4), the grooves 55 allow the second punches 53 to tilt inwardly so as to move the working parts 53a radially inward.

The ring piston 42 housed in the recess 41 of the cylindrical slider 39 is provided with a rod 56 slidably extending through the punch support body 43, and the rod 56 is linked at its upper end with the second punches 53. By raising the ring piston 42 after the first punches 52 reach their upper limit (see FIGS. 3 and 4), the second punches 53 are moved upward via the rod 56.

Fluid pressure such as air pressure is suitable for moving the respective members. Alternatively, a spring means may be used for biasing the respective members instead of fluid pressure.

The cylindrical slider 39 is in contact with a top end of a first knock out pin 59 extending through the pressure plate 35 so as to be vertically movable upward from the position shown in FIG. 1. A bottom end of the pin 59 opposes a top surface of a ring-shaped pad 58 which surrounds a peripheral surface of the anvil 33. The pad 58 is vertically movable in sliding contact with the peripheral surface of the anvil 33. A second knock out pin 57 extends through the lower die set plate 30 so that its top end engages a bottom surface of the pad 58. The pin 57 is movable upward from the position shown in FIG. 1 under fluid, e.g. air pressure, or spring biasing, to drive the slider 39 upward to the positions shown in FIGS. 3 and 4 through the pad 58 and pin 59.

The forming process with use of the present die is described below. With the knock out pin 57 being in the lowered position is shown in FIG. 1, pressurized fluid is supplied from the passage 47 into the passage 45 so as to lower the cylindrical slider 39 and the ring piston 42 against the force of air pressure to the lower chamber of recess 41 below the piston 42 whereby both first and second punches 52 and 53 reach the lower limit, when the working parts 52a and 53a are closely assembled around the top of the punch guide 34 to make a operative forming die. (See FIG. 2A). A workpiece is supplied so as to cover the punches 52 and 53. The opening of the workpiece is not yet ironed and has an excess metal required to be ironed.

If the air pressure is released through the passage 46 for the preparation of performing the forming process, the cylindrical slider 39 can be lowered together with the downward movement of the upper die assembly. However, if the cylindrical slider 39 is moved downward together with the workpiece set on the inwardly tilted punches, the working parts 52a and 53a of the punches 52 and 53 will expand when they come into contact with the punch guide 34.

If the workpiece is set on inwardly tilted punches as described above, the punches will sometimes fail to be set at proper positions when they are lowered. Since the inside of the workpiece is preformed, each punch must be set at the predetermined position. Therefore, in order to perform a perfect forming process, it is preferable to push down the punches so that their working parts are located around the punch guide, before the workpiece is supplied.

FIG. 1 shows a condition in which the press slide (not shown) reaches the bottom dead center accompanied with the upper die assembly 20, completing the forming process of the workpiece 28 to iron it to narrow the outer circumference with use of the ironing die 24. When the slide starts to move upward accompanied by the first knock out pin 57 the pin 57 lifts the pad 58, the second knock out pin 59 and the cylindrical slider 39, which moves up the first and second punches 52 and 53 along the punch guide 34. In this condition, no air pressure is supplied into the lower chamber below the ring piston 42 in the recess 41. Further, the air pressure which was supplied into the upper chamber of the recess 41 and the air chamber 40 between the cylindrical slider 39 and the cylinder 36 is discharged through the passage 47.

When the punches 52 and 53 move upward and the ends of the longer grooves 54 formed inside the first punches 52 reach the top of the punch guide 34, the working parts 52a of the first punches 52 tilt inwardly. Consequently, the outer diameter of the set of working parts 52a become smaller than that at the time of the forming process, and the first punches 52 (but not the second punches 53) can be removed from the recess of the workpiece. (See FIGS. 2B and 3).

With the upper die assembly 20 being moved further up, air pressure is supplied through the passage 48 into the passage 46 so as to lift the ring piston 42. The ring piston 42 moves up the second punches 53 via the rod 56. When the shorter grooves 55 formed inside the second punches 53 reach the top of the punch guide 34, the working parts 53a of the second punches 53 tilt inwardly so that the set of working parts 53a becomes reduced in outer diameter. Consequently, both first and second punches 52 and 53 can be removed from the recess of the workpiece. (See FIGS. 2C and 4).

After the punches are pulled out, the stopper 27 engages with the lower end of the formed workpiece 28, supporting the same while the upper die assembly 20 moves upward. The formed workpiece 28 is then withdrawn from the upper die assembly after being removed from the punches 52 and 53.

Figure 5:
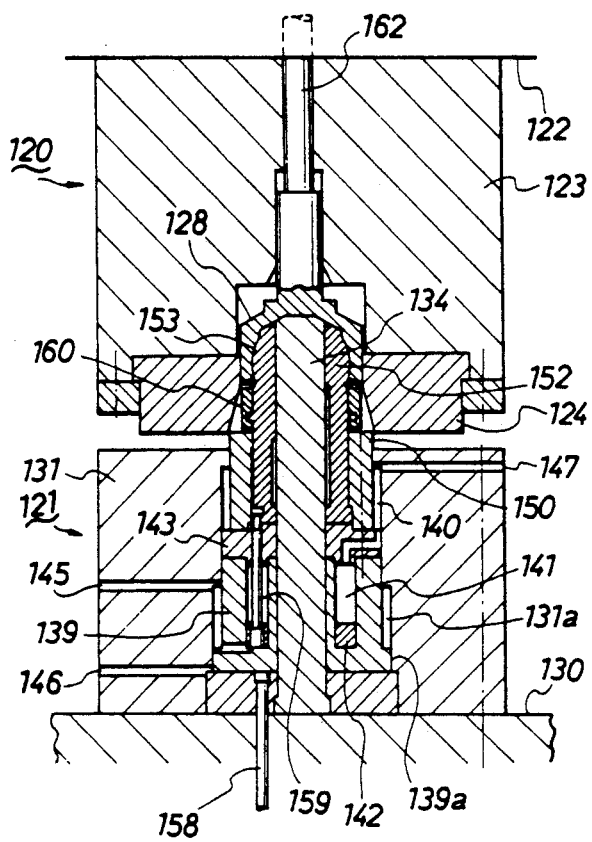
Figure 6:
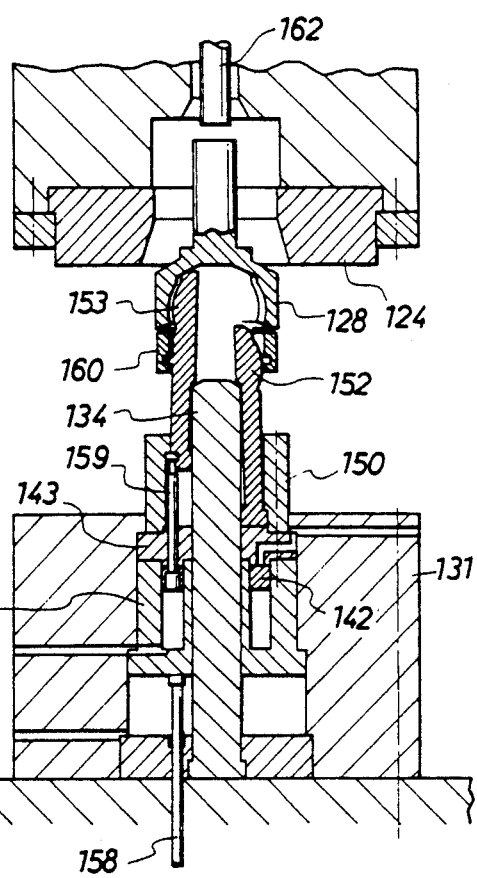
Figure 7:
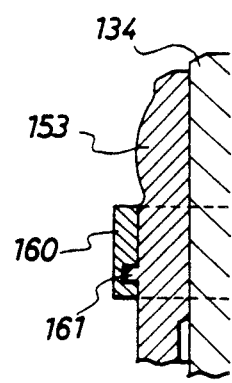

FIGS. 5 to 7 show a second embodiment of the invention. Reference numerals 120 and 121 designate upper and lower die assemblies, respectively. The upper die assembly 120 comprises an upper die set plate 122, an upper die holder 123 fixed thereto, and a die 124 fixed to the lower end of the holder 123. The lower die assembly 121 comprises a lower die set plate 130 and a cylindrical lower die holder 131 fixed thereto. A punch guide 134 is provided in the center of the lower die holder 131 and fixed to the lower die set plate 130.

Further, the lower die holder 131 is in the shape of a cylinder, in which holder a cylindrical slider 139, a punch support body 143 and a punch holding tube 150 all bolted into an integral structure are slidably housed. On the punch support body 143, there is provided a group of six punches comprising three first punches 152 and three second punches 153, disposed alternately in a ring about punch guide 134. The cylindrical slider 139 has its lower end formed as a piston 139a, and a cylinder chamber 131a is formed between the piston 139a and the lower die holder 131. Further, the cylindrical slider 139 is formed with a ring-shaped recess 141 in which a ring piston 142 is housed. The recess 141 surrounds the cylindrical inner surface of the slider 139.

The punch support body 143 is slidable within an air chamber 140 formed in the upper part of the lower die holder 131. The piston 139a divides the cylinder chamber 131a into upper and lower chambers. Through a passage 145, fluid pressure such as air pressure is supplied into the upper chamber of the cylinder chamber 131a, while the lower chamber of the cylinder chamber 131a is open to the atmosphere through a passage 146.

Reference numerals 158 and 159 respectively designate a first knock out pin for pushing up the cylindrical slider 139 and a second knock out pin linking the ring piston 142 to the second punches 153.

The configuration of the contact surfaces between the punches 152 and 153 is the same as that of the first embodiment. In the second embodiment, the punches 152 and 153 are fitted with a support ring 160. The support ring 160 has an inside groove in engagement with projections formed outside of the second punches 153, and is adapted to move up and down together with the punches. A workpiece 128 is always biased downward by a knock out rod 162 under fluid pressure.

In the second embodiment, the knock out rod 162 ejects the workpiece from the die 124 and leaves it on the punches as the press slide moves up from the bottom dead center. The support ring 160 moves up together with the second punches 153, supporting the formed workpiece released from the punches.

With the upward movement of the first knock out pin 158 and the punch support body 143, the punches 152 and 153 move up together with the formed workpiece, and the working parts of the first punches 152 are tilted radially inward above the punch guide 134.

Subsequently, when the fluid pressure applied through passage 145 lifts the ring-shaped piston 142, the second knock out pin 159 moves only the second punches 153 upward to an upper limit higher than the first punches 152, where they are tilted radially inward at their working parts, and in this condition, the formed workpiece is removed from the punches (see FIG. 6).

Thereafter, fluid pressure is supplied from a passage 147 so as to lower the ring piston 142 and at the same time the pressurized fluid is discharged form the passage 145 so as to lower the knock out pin 158, whereupon the punches 152 and 153 return to a waiting position.

Figure 8:
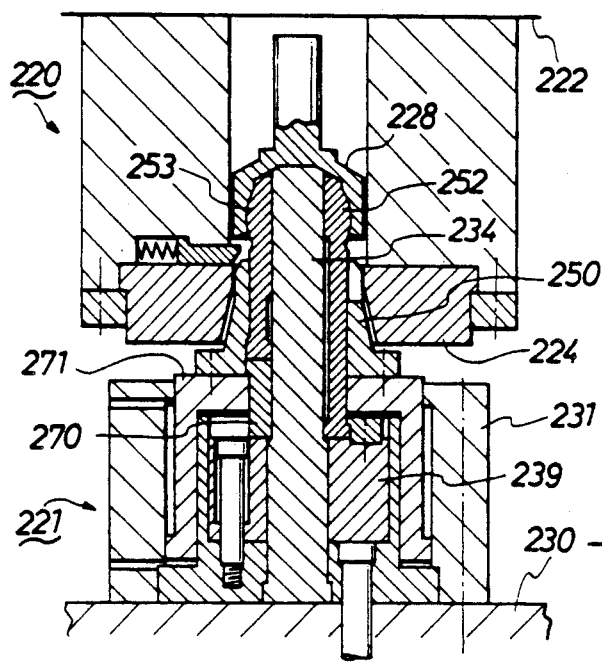
Figure 9:
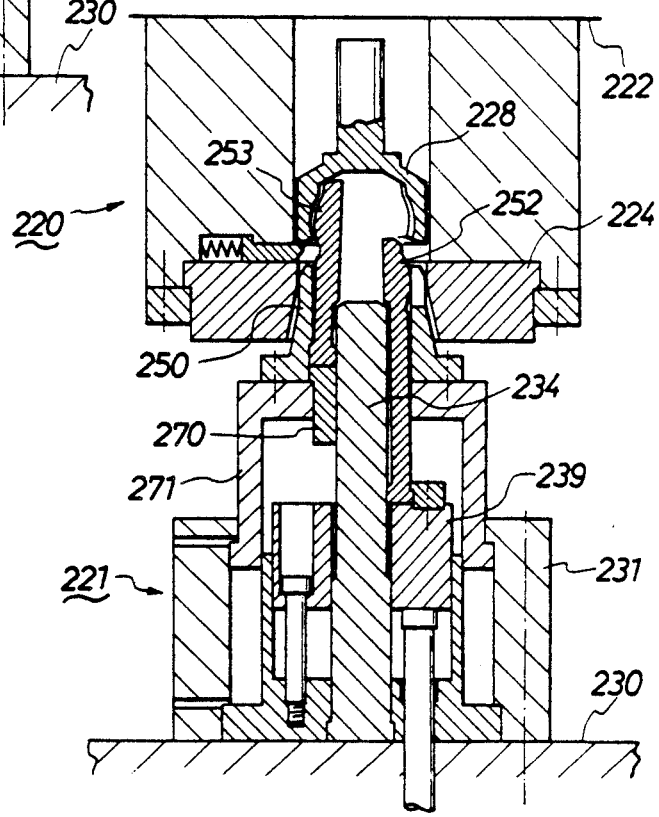

FIGS. 8 and 9 show a third embodiment of the invention, in which second punches 253 are shorter than first punches 252 and blocks 270 are mounted between the lower ends of the second punches 253 and a cylindrical slider 239.

In this embodiment, the upward movement of the cylindrical slider 239 causes the second punches to make a delayed further upward movement beyond the first punches.

A lower die holder 231 has an outside slider 271 going in and out of the holder. A tube 250 for holding the punches 252 and 253 is provided on the top of the outside slider 271. The block 270 is formed with a stepped portion in the upper end thereof, and this stepped portion engages with the outside slider 271, so that the block 270 and second punches 253 are lifted with the outside slider 271.

Therefore, when the outside slider 271 is lifted, the second punches 253 but not the first punches 252 move upward. The up and down movement of the outside slider 271 is driven by fluid pressure supplied into and withdrawn from a cylindrical space in the lower die holder 231 in which the outside slider 271 slides. In this embodiment using the outside slider 271 to lift the second punches 253, such lifting movement can be made more stable than that in the first embodiment.

Figure 10:
FIG. 10 is a sectional view of another example of a formed part which can be formed with the method and apparatus of the invention.

FIG. 10 illustrates an outer race 300 of a spherical roller bearing which is another example of a product ironed so as to have an opening narrower than the interior. The invention is also applicable to this illustrated example by matching the shape of closely assembled working parts of punches to the shape of the product.

Figure 11:
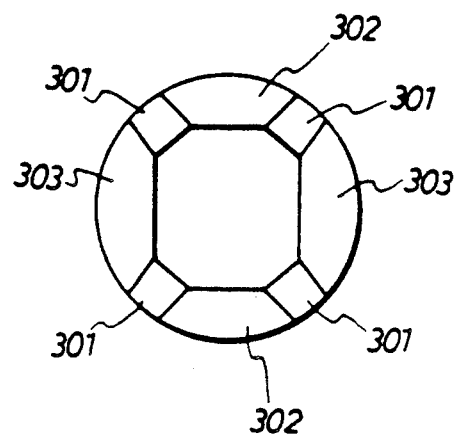
FIG. 11 is a plan view of punches for working the formed part shown in FIG. 10.
Figure 12A:
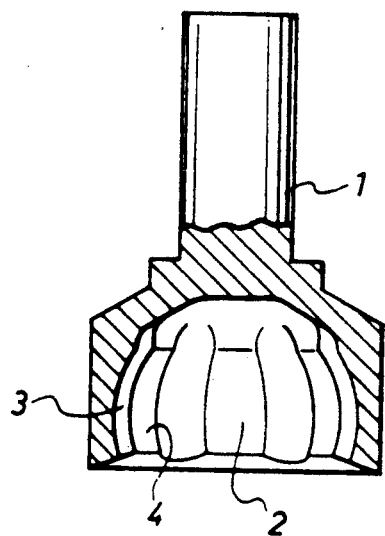
FIG. 12A is a sectional view of a constant velocity joint which can be manufactured with the method and apparatus of the invention.
Figure 12B:
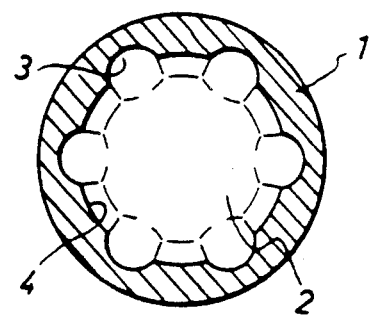
FIG. 12B is a side view thereof.
Figure 13A:
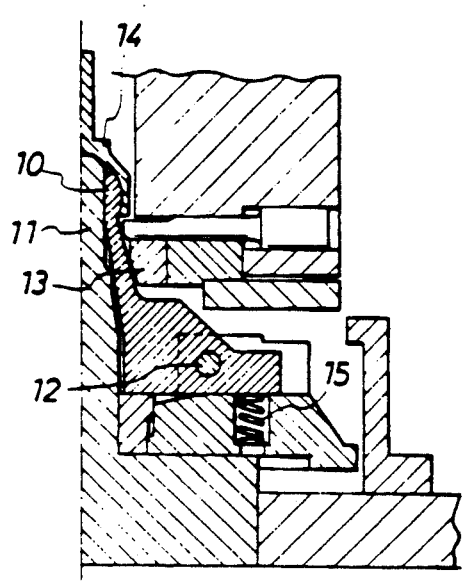
FIG. 13A is a sectional view of a prior art die apparatus in a position of completing a work.
Figure 13B:
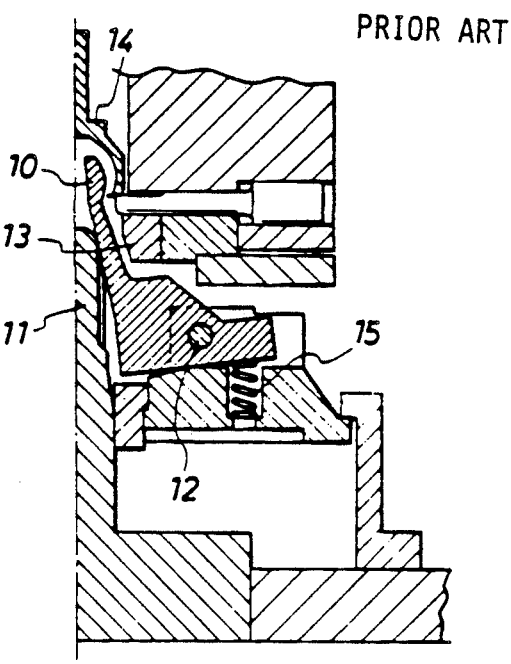
FIG. 13B is a sectional view of punches in a radially inward position.
Figure 14:
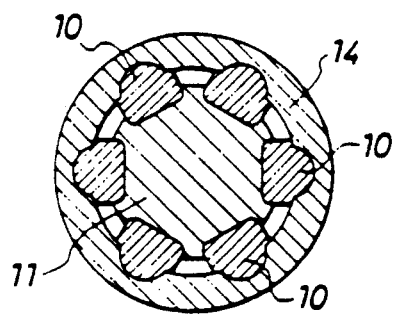
FIG. 14 is a horizontal sectional view of punches shown in FIG. 13A to which a workpiece is supplied.
Figure 15:
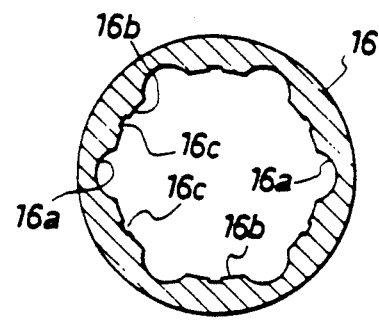
FIG. 15 is a bottom view of an improved prior art workpiece.

FIG. 11 shows a group of punches for forming the product of FIG. 10. A group of eight divided punches consists of three shapes of punches, namely first punches 301, second punches 302 and third punches 303. The second and third punches 302 and 303 are symmetrical with respect to the axis and disposed alternatively, with the first punch 301 being interposed between the second and third punches 302 and 303, The reduction of the outside diameter of the group is performed by moving radially inward the working parts of firstly the first punches 301 and then of the second and third punches 302 and 303 simultaneously.

The invention now being fully described, it will be apparent to one of ordinary skill in the art that many changes and modifications can be made thereto without departing from the spirit or scope of the invention as set forth herein.

The present disclosure relates to the subject matter disclosed in Japanese Application 62-52272 of Mar. 12th, 1987 and Japanese Application 62-166447 of July 3rd, 1987, the entire specifications of which are incorporated herein by reference.

What is claimed is:

1. A method of manufacturing an article from a workpiece preformed with a recess having an opening at a surface of the recess, the opening having an axis extending into the recess, the workpiece requiring ironing to further shape the workpiece, the method comprising the steps of:

disposing working parts at upper ends of a group of axially upwardly extending punches in the recess, the group of punches including first punches and second punches, disposed alternately in a compact closed loop arrangement circumferentially about and in axially sliding contact with an axially extending punch guide so that the working parts of each first punch contacts respective ones of the second punches on opposite sides thereof, the workpiece being disposed above a top end of the punch guide, the first punches having respective first axially extending grooves of a first given length, facing the punch guide, the second punches having respective second axially extending grooves of a second given length different than the first given length, facing the punch guide;

ironing the workpiece with the working parts of the group of punches to shape the recess such that the opening has a diameter measured relative to the axis which is less than an interior diameter of the recess measured relative to the axis;

after said step of ironing, applying upward forces on the first and second punches only at locations spaced from the workpiece so as to move the workpiece and the first and second punches in the upward axial direction relative to the punch guide while maintaining the punch guide stationary until the first groove oppose a top end of the punch guide, then pivoting the first punches relative to the workpiece and the punch guide so that the first grooves receive a portion of the top end of the punch guide and the working parts of the first punches move relative the second punches radially inward toward the axis; and after said step of pivoting the first punches, applying upward forces on the second punches only at locations spaced from the workpiece so as to move the second punches with the workpiece thereon in the upward axial direction relative to the punch guide and the first punches until the second grooves oppose the top end of the punch guide, then pivoting the second punches so that the first grooves receive a portion of the top end of the punch guide and the working parts of the second punches move relative the workpiece radially inward toward the axis, whereby the workpiece may be axially removed from the group of punches.

2. A method as in claim 1, wherein the group of punches consists of three of the first punches and three of the second punches.

3. A method as in claim 1, the first punches are of a first shape and disposed symmetrically with respect to the axis and the second punches are of a second shape different than the first shape and disposed symmetrically with respect to the axis.

4. A method as in claim 1, wherein the first and second punches are axially extending rod-shaped members which are supported on a punch support body, the punch support body being integral with a cylindrical slider which is slidably mounted to the punch guide for axial movement therealong, said step of moving the workpiece and the first and second punches in the upward axial direction relative to the punch guide comprising the step of axially moving the cylindrical slider along the punch guide so as to cause the first and second punches to move axially relative to the punch guide.

5. A method as in claim 1, wherein the first and second punches are supported on a punch support body which is integral with a cylindrical slider, the cylindrical slider being slidably mounted to the punch guide for axial movement therealong, the second punches being linked with a rod extending through the punch support body, the rod being connected to a piston axially slidably housed in a recess in the cylindrical slider; said step of moving the workpiece and the first and second punches in the upward axial direction relative to the punch guide comprising the step of axially moving the cylindrical slider along the punch guide so as to cause the first and second punches to move axially relative to the punch guide; said step of moving the second punches in the upward axial direction relative to the punch guide and the first punches comprising the step of axially slidably moving the piston so as to axially move the rod and second punches, after said step of axially moving the cylindrical slider.

6. An apparatus for use in manufacturing a hollow article having an internal surface at least part of which is undercut, comprising:

a first die assembly having a first die mounted thereto;
a second die assembly below said first die assembly, having a punch guide immovably mounted thereto projecting toward said first die assembly in an upward axial direction;

a group of circumferentially divided punches mounted in a loop about said punch guide for axial movement relative to said punch guide, each punch having a working part at an upper end thereof, said group consisting of a set of first punches and a set of second punches, said first and second punches being disposed alternately in a compact closed loop arrangement so that the working parts of each first punch contacts respective ones of the second punches on opposite circumferential sides thereof to carry the article thereon in engagement with the internal surface thereof above a top end of said punch guide, the first punches having respective first axially extending grooves of a first given length below the working parts thereof, facing said punch guide, said second punches having respective second axially extending grooves of a second given length different than the first given length below the working parts thereof, facing said punch guide;

first moving means for applying upward forces on said first and second punches only at locations spaced from the article carried thereon so as to move the first and second punches and the article thereon in the upwardly axial direction simultaneously along said punch guide to a first position whereat the working parts of only said first punches are radially inwardly movable relative to said punch guide and inward of the internal surface of the article such that a portion of said punch guide is received in said first grooves to reduce an outer diameter of said set of first punches; and second moving means for applying upward forces on said second punches only at locations spaced from the article so as to move only said second punches with the article thereon in the upward axial direction from said first position to a second position whereat the working parts of said second punches are radially inwardly movable relative to said punch guide such that a portion of said punch guide is received in said second grooves to reduce an outer diameter of said set of second punches.

7. An apparatus as in claim 6, wherein said first and second punches have legs supporting said working parts, said legs having lower ends opposite said working parts which are engaged by said first moving means to move said first and second punches to said first position, the legs of said second punches being shorter than the legs of said first punches, the apparatus further comprising blocks between said second punches and said second moving means, said lower ends of second punches being disposed on said blocks, said blocks being engaged by said second moving means so as to move said blocks and said second punches thereon.

8. An apparatus as in claim 7, wherein said blocks are disposed on said first moving means interposed between said first moving means and said second punches, so that said blocks with said second punches thereon are moved by said first moving means.

9. An apparatus as in claim 6, wherein said first moving means includes a cylindrical slider which is slidably mounted to said punch guide for axial movement therealong and a punch support body integral with said cylindrical slider supporting said first and second punches, said first and second punches being axially extending rod-shaped members.

10. An apparatus as in claim 6, wherein said first moving means includes:
a cylindrical slider having a recess, slidably mounted to the punch guide for axial movement therealong, and
a punch support body which is integral with said cylindrical slider and supports said first and second punches; said second moving means including:
a piston axially slidably housed in said recess in said cylindrical slider, and
a rod extending through the punch support body and connected to said piston, said second punches being linked with said rod so as to be axially movable therewith from the first position to the second position.

11. An apparatus as in claim 6, wherein each of said punches has circumferentially opposite side surfaces extending generally radially with respect to the axis of said punch guide flush with respective side surfaces of the punches immediately adjacent thereto.

* * * * *